United States Patent
Bragg et al.

(10) Patent No.: US 6,791,563 B2
(45) Date of Patent: Sep. 14, 2004

(54) SYSTEM, METHOD AND COMPUTER PROGRAM PRODUCT FOR GLOBAL RENDERING

(75) Inventors: Dennis Bragg, Downingtown, PA (US); Peter Segal, West Chester, PA (US)

(73) Assignee: Bentley Systems, Incorporated, Exton, PA (US)

(*) Notice: Subject to any disclaimer, the term of this patent is extended or adjusted under 35 U.S.C. 154(b) by 167 days.

(21) Appl. No.: 09/954,001

(22) Filed: Sep. 18, 2001

(65) Prior Publication Data

US 2003/0052891 A1 Mar. 20, 2003

(51) Int. Cl.$^7$ .................................................. G09G 5/00
(52) U.S. Cl. ........................ 345/582; 345/426; 345/622
(58) Field of Search ................................ 345/582, 426, 345/622

(56) References Cited

U.S. PATENT DOCUMENTS

| | | | | |
|---|---|---|---|---|
| 5,737,506 A | * | 4/1998 | McKenna et al. | .......... 345/582 |
| 5,808,617 A | | 9/1998 | Kenworthy et al. | |
| 5,845,874 A | | 12/1998 | Beasley | |
| 5,870,098 A | * | 2/1999 | Gardiner | .................... 345/426 |
| 5,892,516 A | | 4/1999 | Alexander | |
| 5,986,663 A | | 11/1999 | Wilde | |
| 6,016,150 A | | 1/2000 | Lengyel et al. | |
| 6,057,850 A | | 5/2000 | Kichury | |
| 6,078,332 A | | 6/2000 | Ohazama | |
| 6,163,320 A | | 12/2000 | Barcena et al. | |
| 6,204,857 B1 | | 3/2001 | Piazza et al. | |
| 6,437,782 B1 | * | 8/2002 | Pieragostini et al. | ........ 345/426 |

* cited by examiner

*Primary Examiner*—Matthew C. Bella
*Assistant Examiner*—Antonio Caschera
(74) *Attorney, Agent, or Firm*—Venable LLP; Jeffri A. Kaminski; Caroline Swindell

(57) ABSTRACT

The method of global rendering allows a three dimensional scene to be rendered accurately and viewed correctly from multiple angles and directions at once. The method includes the steps of placing an object representing a multidimensional texture map into a database, replacing the object with a bounding geometry that completely encloses the object, sampling the bounding geometry with a sample of interest, extracting pixel information from the sample of the bounding geometry, and displaying the rendered object using the extracted pixel information. The pixel information is extracted by computing a direction from the center of the bounding geometry to the origin of the sample of interest, identifying a vertical plane that contains the center point of the bounding geometry and that is perpendicular to the sample of interest, projecting the sample onto the vertical plane, computing the coordinates of the projected sample in the vertical plane, extracting an image from a multi-dimensional texture wherein the image faces the computed direction, extracting a pixel from the image that corresponds to the coordinate, and extracting a color, a transparency, a Z-depth or a surface normal of the extracted pixel.

23 Claims, 9 Drawing Sheets

SYSTEM, METHOD AND COMPUTER PROGRAM PRODUCT FOR GLOBAL RENDERING

BACKGROUND OF THE INVENTION

1. Field of the Invention

The present invention relates generally to computer graphics systems, and more specifically to a method for global rendering of multidimensional textures.

2. Related Art

Computer rendering is the art of representing a three dimensional (3D) object or scene in the two dimensional (2D) space of a computer screen or other flat medium. Vast increases in computing power have resulted in increasingly complex and sophisticated computer applications. Such applications often call for equally sophisticated and complex computer rendering. Typically, 3D objects are rendered, or modeled, as a collection of joined polygons (typically triangles) defined by vertex positions and attributes. The end result of the rendering process is a collection of pixels for each surface of the projected polygon.

In early rendering processes, designers would take a picture of an object, such as a tree or a person, and simply map that image to a vertical plane oriented towards the viewpoint in their scene. In this fashion, one could place various objects into the scene and have them appear natural. This technique is analogous to placing a number of billboards into the scene, each oriented toward the viewer. This worked well for static scenes but, for the dynamic effects required by animation, and for more complex lighting schemes, it was clear that the objects are really two dimensional billboards.

Traditionally, designers wishing to render a 3D object, such as a person or a tree, would take a series of photographs of that object, for example, around an entire 360 degree panorama with each photograph offset by one or two degrees from the previous photograph. This plurality of images was then combined into a single file. Such a file is often referred to as a multidimensional texture (MDT). When the rendering operation was performed, the software would place an empty plane representing the object in the scene to be rendered, and would select, from the plurality of images in the file, the image corresponding to the current viewpoint, i.e. the image that was facing the viewer. In this fashion, if the viewer is looking at the front of the object, the software will pick the image representing that side. If the viewer were looking at the back of the object, the software would pick the image representing the back of the object. It will be appreciated, however, that this image is still just a two dimensional plane in the scene, i.e., it is still just like a billboard.

Because images are still represented by a plane or a billboard, it is difficult to perform complex lighting and shading operations in the scene. This is particularly true when the scene contains a plurality of light sources, or when the light source is perpendicular to the 2D billboard representing the object. These sorts of complex rendering operations are referred to herein as "global rendering." It will be appreciated that such global rendering has the potential to enhance realism by modeling real world visual effects such as shadows, surface shading, and illumination from various different sources of light.

The disadvantages of the billboard technique are illustrated in FIGS. 1A and 1B. Each illustration is an actual rendering using a conventional rendering method, and each illustration represents the same view of a multi-dimensional texture object 104 placed in a room with two mirrored walls 112 and 114. The large object in the middle of the view is the object as seen from the viewpoint location. The other three objects 106, 108 and 110 in each view are reflections of the object 104 in the mirrored walls.

FIG. 1A shows the single, static rectangle used by the conventional method to render MDTs. For each MDT object, a vertical rectangle 104 is placed in the scene 102 and oriented so that it is perpendicular to the view direction. A single texture image from the MDT file is extracted and mapped to this rectangle. A shadow 116 is cast from a light source that is perpendicular to the view direction.

FIG. 1B shows a single texture from the MDT file mapped to the rectangle in FIG. 1A. The foreground object 118 displays the correct side view of the texture object. However, there are several problems inherent with this method when global light effects are considered. First, the reflections of the foreground object 120, 122 and 124 in the mirrored walls incorrectly display the same side view of the texture as the foreground object. Second, the reflected images of the object (especially reflection 124) are distorted because the reflected planes are not perpendicular to the view direction. Third, the shadow 126 cast by the foreground object is extremely thin. This is because the direction of the light source is almost parallel to the plane of the foreground object 118. The limitations of the established method result in incorrect and distorted views of the object from the other view locations.

It would be desirable, therefore, to provide a method of rendering that allows more realistic global illumination and rendering of 3D scenes.

SUMMARY OF THE INVENTION

In an exemplary embodiment of the present invention, a system, method and computer program product for global rendering of multidimensional textures (MDTs) using bounded volumes are disclosed. By using bounded volumes, objects to be rendered receive more realistic representation in a scene.

It is an advantage of the present invention that an image in a computer can be rendered realistically from any view simultaneously. By using bounding geometry combined with multi-dimensional texture files, the present invention eliminates the problems of incorrect shadows, distorted views and incorrect lighting effects that existed with previous techniques of rendering that only rendered one view at a time.

In an exemplary embodiment, the present invention can be a method in a computer system for global rendering of a multidimensional texture map including the steps of placing an object representing a multidimensional texture map into a database, replacing the object with a bounding geometry, sampling the bounding geometry with a sample of interest having an origin and a direction, extracting pixel information used for global rendering of the object from the sample of the bounding geometry, and displaying the object using the extracted pixel information. The bounding geometry can be a volume that completely encloses the object, and can be a cylinder with height equal to the object, and diameter equal to the width of the object, and the cylinder can be capped by a hemisphere of the same diameter. The sample of interest can be determined by an external rendering engine, and the origin can be for example, a camera, a light source or a point on a reflecting surface.

The pixel information extraction step can further include the steps of computing a direction from the center of the bounding geometry to the origin of the sample of interest, identifying a vertical plane that contains the center point of the bounding geometry and that is perpendicular to the sample of interest, projecting the sample onto the vertical plane, computing a coordinate of the projected sample in the vertical plane, extracting an image from a multi-dimensional texture where the image faces the computed direction, extracting a pixel from the image that corresponds to the coordinate, and extracting texture information about the pixel. The texture information can be the color, transparency, Z-depth, or surface normal of the extracted pixel.

Computing a coordinate of the projected sample in the vertical plane can include setting a coordinate origin at the lower left corner of the vertical plane as viewed from the origin of the sample of interest, computing a U coordinate of the projected sample as the horizontal distance from the coordinate origin to the projected sample, and computing a V coordinate of the projected sample as the vertical the coordinate origin to the projected sample.

In an alternative exemplary embodiment, the present invention can be a system that performs global rendering of a multidimensional texture map including a processor, a memory coupled to the processor, a rendering engine executable by the processor, a multidimensional texture (MDT) map global rendering module executable by the processor operative to render MDT's globally, where the MDT map global rendering module includes a placement module operative to place an object representing a MDT map into a database, a replacement module that replaces the object with a bounding geometry, a sampler that samples the bounding geometry with a sample of interest comprising an origin and a direction, and an pixel information extractor that extracts pixel information, used for global rendering of the object by the rendering engine, from the sample of the bounding geometry. The system of the present invention can further include a display. In the system, the bounding geometry can be a volume that completely encloses the object, and the volume can be a cylinder with a height equal to the object, and a diameter equal to the width of the object; and wherein the cylinder is capped by a hemisphere of the same diameter. The sample of interest can be determined by an external rendering engine. The origin of the sample of interest can be a camera, a light source or a point on a reflecting surface.

The system's pixel information extractor can include a direction calculator that computes a direction from the center of the bounding geometry to the origin of the sample of interest, an identifier that identifies a vertical plane that contains the center point of the bounding geometry and that is perpendicular to the sample of interest, a projector that projects the sample onto the vertical plane, a coordinate calculator that computes a coordinate of the projected sample in the vertical plane, an image extractor that extracts an image from a multi-dimensional texture wherein the image faces the computed direction, a pixel extractor that extracts a pixel from the image that corresponds to the coordinate, and a texture extractor that extracts a color, a transparency, a z-depth, or a surface normal of the extracted pixel.

In yet another embodiment, the present invention can be a computer program product, including program logic, embodied on a computer readable medium, where the computer program product includes global rendering means for global rendering of a multidimensional texture map. The global rendering means includes placement means for placing an object representing a MDT map into a database, replacement means for replacing the object with a bounding geometry, sampling means for sampling the bounding geometry with a sample of interest comprising an origin and a direction, and pixel information extraction means for extracting from the bounding geometry pixel information used for global rendering of the object. The computer program can further include display means for displaying the extracted pixel information.

The pixel information extraction means can include direction calculation means for computing a direction from the center of the bounding geometry to the origin of the sample of interest, identification means for identifying a vertical plane that contains the center point of the bounding geometry and that is perpendicular to the sample of interest, projection means for projecting the sample onto the vertical plane, coordinate computation means for computing a coordinate of the projected sample in the vertical plane, image extraction means for extracting an image from a multi-dimensional texture wherein the image faces the computed direction, pixel extraction means for extracting a pixel from the image that corresponds to the coordinate, and texture extraction means for extracting a color, a transparency, a Z-depth or a surface normal of the extracted pixel.

The computer program product's bounding geometry can be a volume that completely encloses the object. The volume can be a cylinder with a height equal to the object, and a diameter equal to the width of the object, and the cylinder can be capped by a hemisphere of the same diameter.

In yet another embodiment, the present invention can be system for global rendering of a multidimensional texture map including global rendering means for multidimensional texture (MDT) map global rendering, which includes placement means for placing an object representing a MDT map into a database, replacement means for replacing the object with a bounding geometry, sampling means for sampling the bounding geometry with a sample of interest comprising an origin and a direction, and pixel information extracting means for extracting pixel information, used for global rendering of the object, from the sample of the bounding geometry. The system can further include display means for displaying the extracted pixel information.

Further features and advantages of the invention, as well as the structure and operation of various embodiments of the invention, are described in detail below with reference to the accompanying drawings.

BRIEF DESCRIPTION OF THE DRAWINGS

The invention will be more fully understood from the following detailed description, in conjunction with the accompanying figures.

DETAILED DESCRIPTION OF AN EXEMPLARY EMBODIMENT OF THE PRESENT INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Figure 2A:
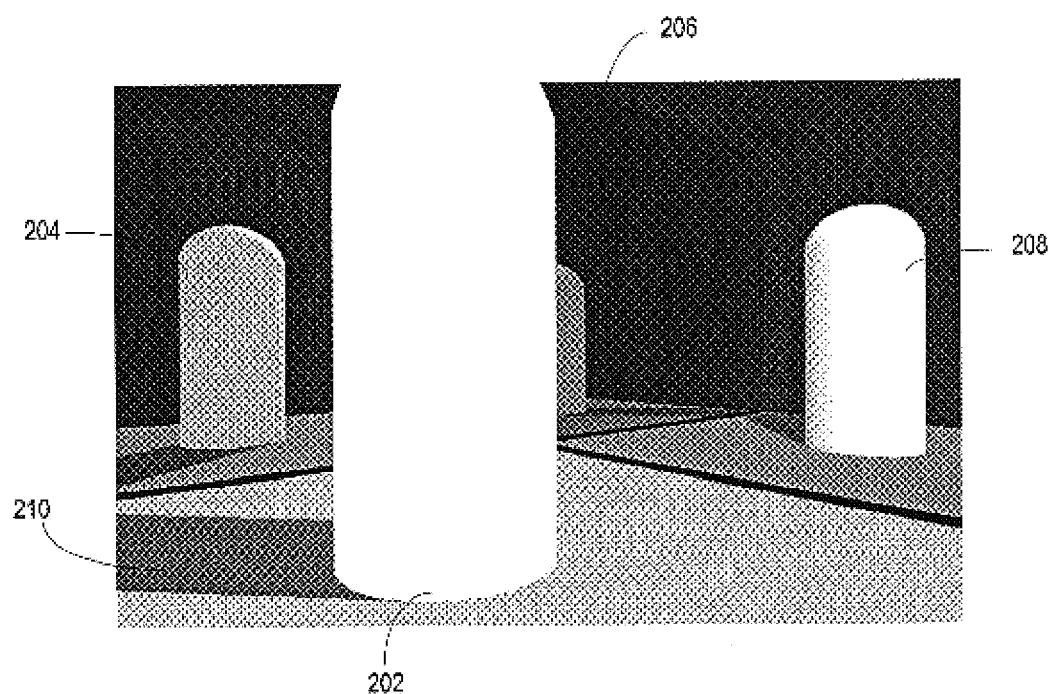
FIGS. 2A and 2B represent and demonstrate how the invention corrects the problems inherent in the background art.
Figure 2B:
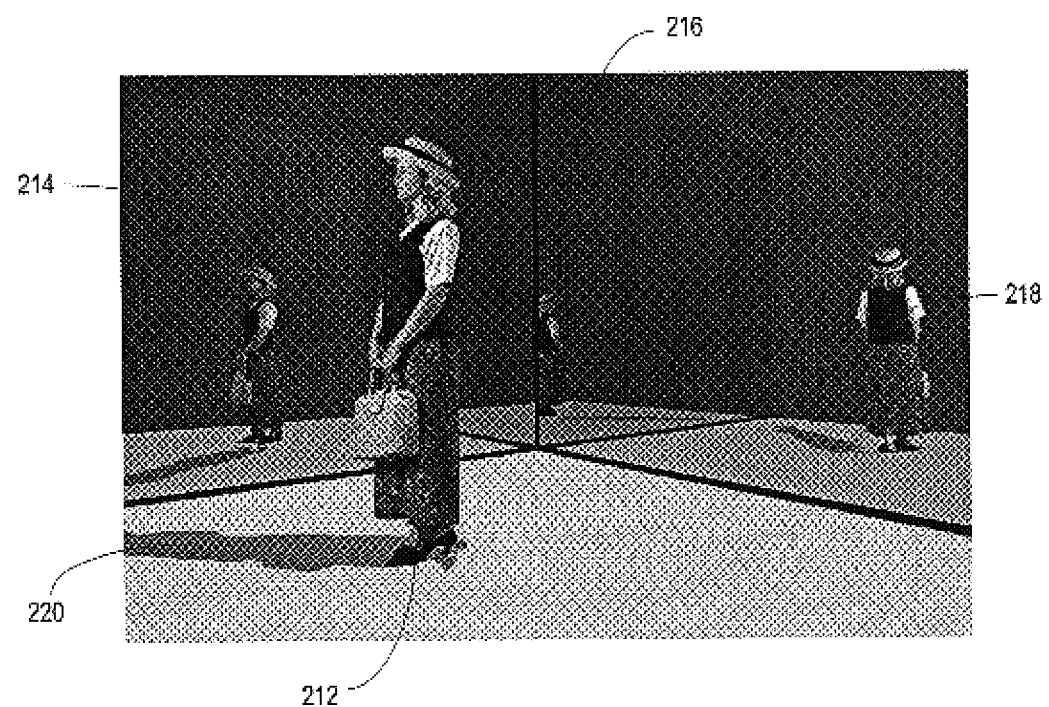

FIGS. 2A and 2B demonstrate the improvement in rendering provided by the present invention. Each illustration is an actual rendering using the method of the present invention, and each illustration represents the same view of a multi-dimensional texture object placed in a room with two mirrored walls. The large object in the middle of the view is the object as seen from the viewpoint location. The other three objects in each view are reflections of the object in the mirrored walls.

Figure 1A:
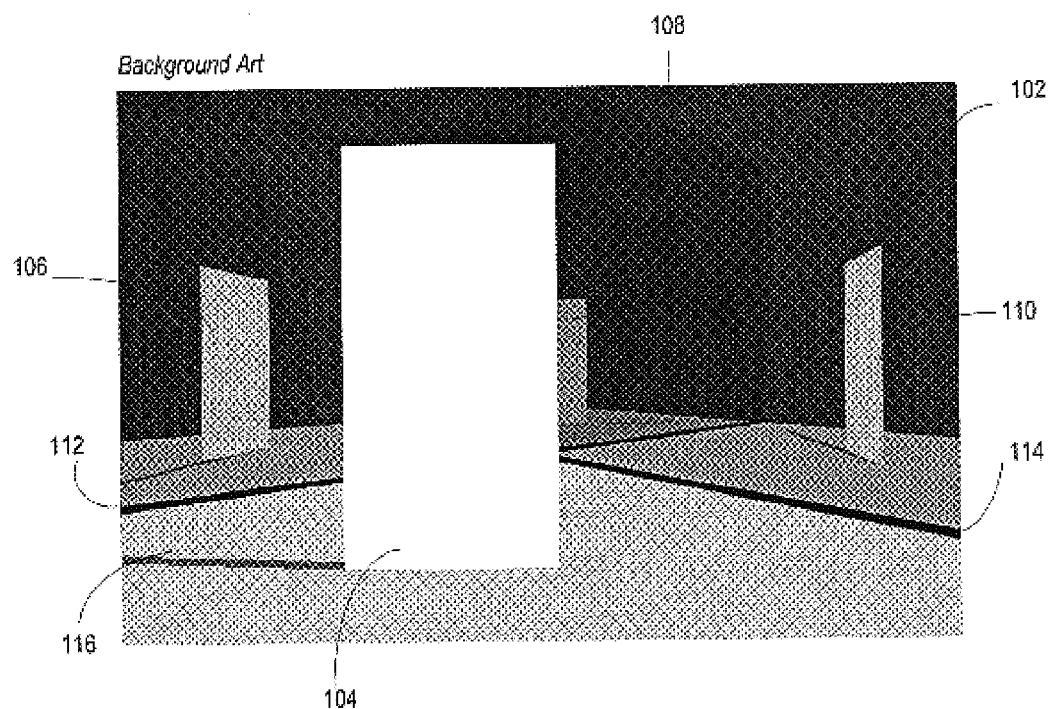
FIGS. 1A and 1B represent and demonstrate the problems existing in the background art and were discussed above.
Figure 1B:
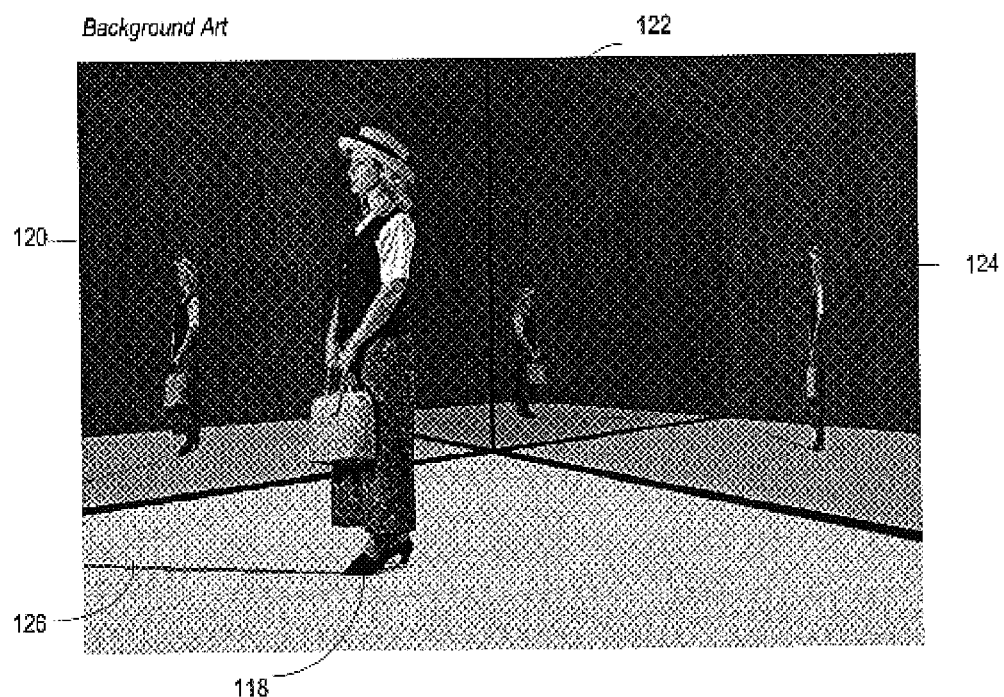

As demonstrated above in the discussion of FIG. 1, the fundamental problem is that each multi-dimensional texture object can only be correctly viewed from the location of the virtual camera. With the present invention, however, in a global illumination solution, each texture object can be simultaneously "viewed" from many other locations. Thus, the object is viewed from the light source and from the mirrored walls.

The term "view" in the context of rendering, and as used throughout the following description, is not limited to a human user seeing the object or scene from one point in space. A "view" can also include, for example, the path and direction traced by light from a light source, or what a virtual camera in the scene would see from its position. Although the human user may be seeing the scene from only one direction, there are generally many "views" within a scene. Each view essentially corresponds to a location in the scene that must take the rendered object into account when displaying itself. Other examples can include shadows and reflections of the rendered object.

FIG. 2A illustrates the three-dimensional bounding volume used to represent the multi-dimensional texture object in the present invention. The bounding volume 202 represents the extents of all of the images contained in the multi-dimensional texture file. The bounding volume can be simultaneously viewed from all directions. The reflections 204, 206 and 208 show the correct view of bounding volume 202 from their respective angles. Likewise, shadow 210 is correctly cast from a light source that is perpendicular to the viewing direction. When a particular view of the object, such as a reflection, is needed during the rendering process, a software program called a procedural texture process dynamically extracts the correct image from the texture file. This dynamic process allows the object to be correctly viewed from any direction.

FIG. 2B represents the results of applying the present invention to a global illumination solution. The global rendering method corrects the problems, described above, associated with previous methods. First, the reflections 214, 216 and 218 of the object 212 in the mirrored walls show the correct view of the object. This is especially noticeable in the reflection 218 where the back side of the object is now seen. Second, the reflected images are no longer distorted. The three-dimensional nature of the bounding volume allows it to be viewed from any direction without distortion. Third, the object casts a full shadow 220.

Figure 2C:
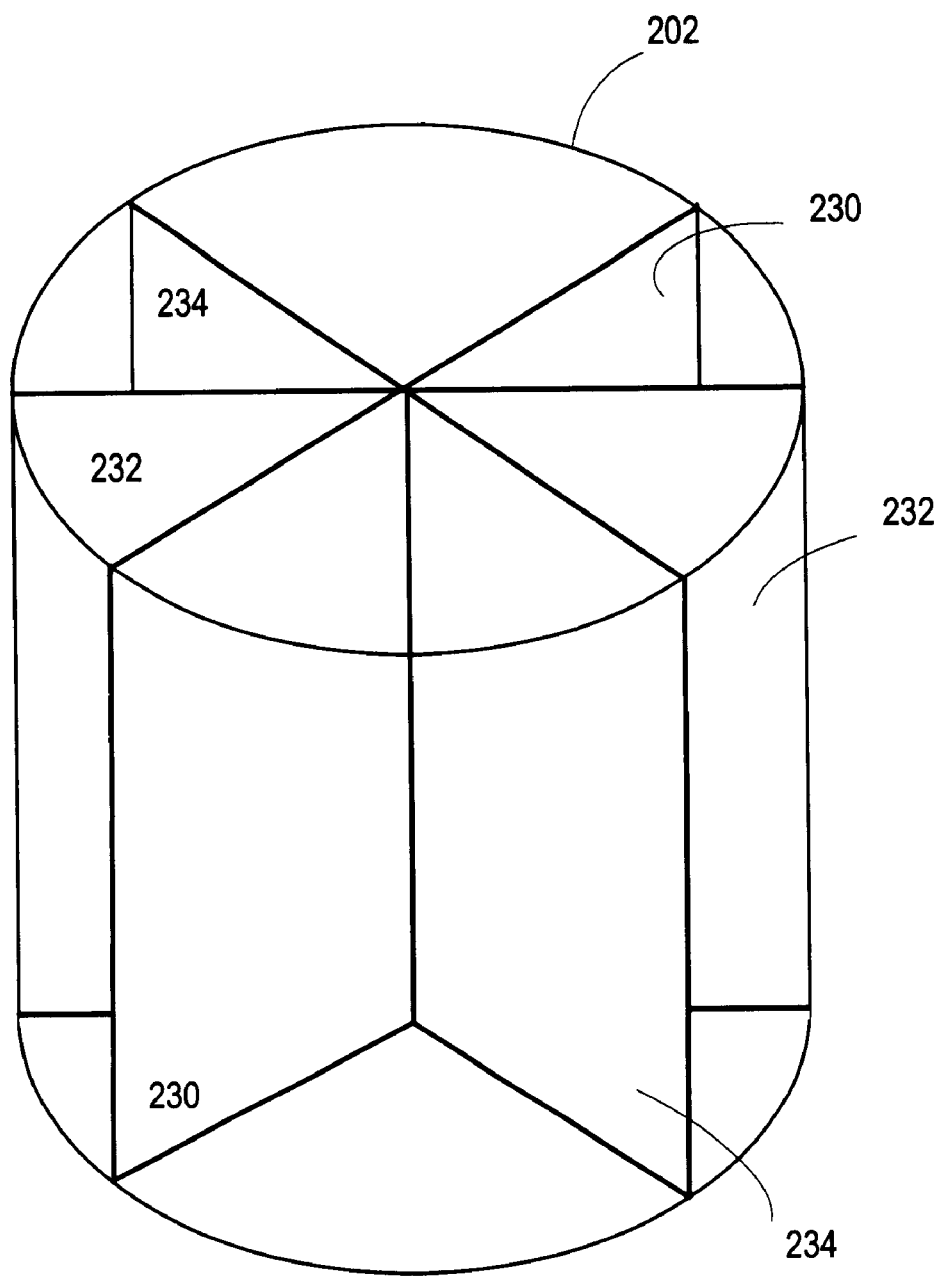
FIG. 2C is an exemplary MDT enclosed by a bounding cylinder.

FIG. 2C illustrates an exemplary MDT enclosed by a bounding cylinder. The exemplary MDT is made up of multiple individual 2D images 230, 232, 234. These 2D images are of the same object, although each image shows the object from a different viewing direction. The width of each image is the same as the diameter of the bounding volume 202, and the height of each image is the same at the height of the bounding volume. While FIG. 2C shows only three MDT images, an exemplary embodiment of the present invention uses many more MDT images per object. The entire collection of MDT images for a single object is known as an MDT file.

Figure 3:
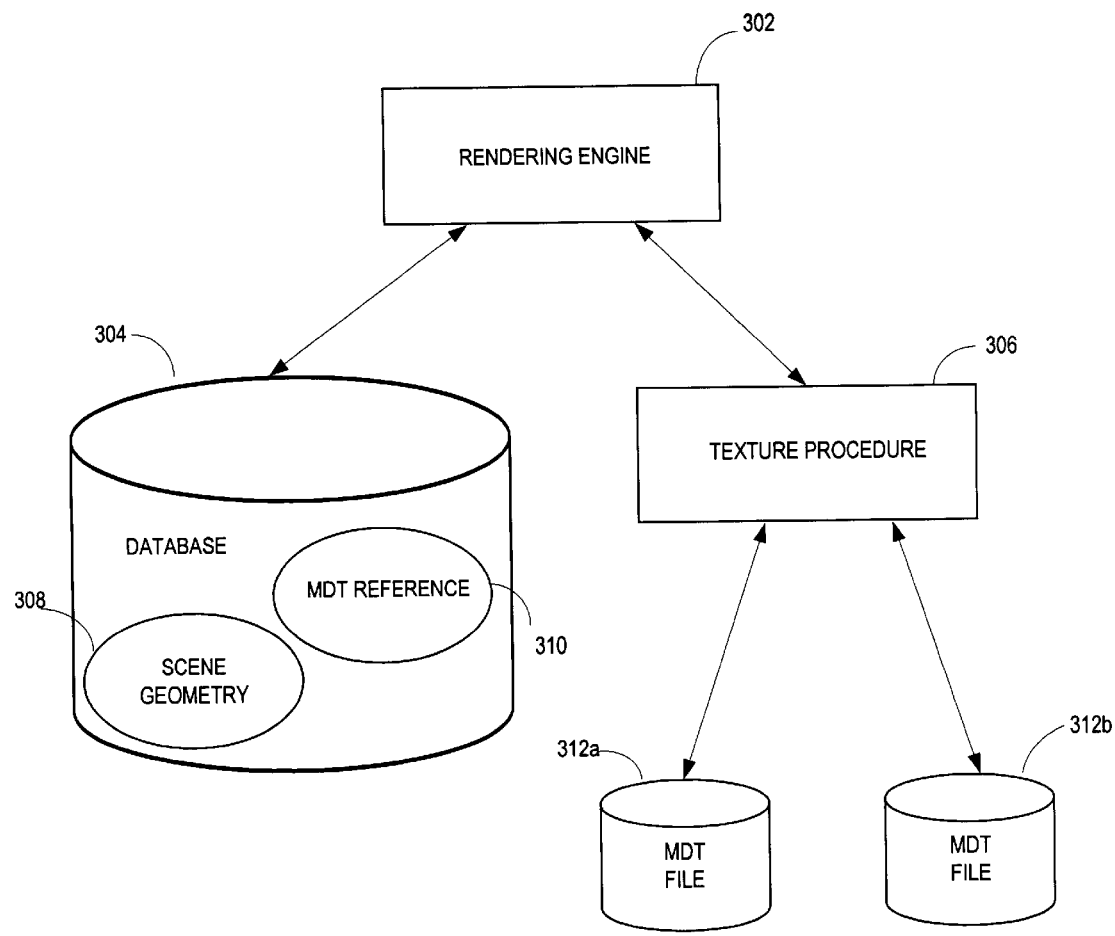
FIG. 3 is a block diagram representing the operating environment of an embodiment.

FIG. 3 represents the operating environment in which the global rendering process operates. Rendering engine 302 is a generic rendering pipeline. A rendering engine is software that uses computer technology to draw 3D images realistically. Such pipelines are well known in the art. Database 304 is the database of all the information describing the scene to be rendered, including geometry 308, lights, material definitions, viewpoint location, and the bounding volumes 310 representative of the MDTs. The rendering pipeline 302 can access the texture procedure 306 of the present invention. The texture procedure 306, in turn, can access multiple MDT files 312a, 312b. The texture procedure can contain various software modules for completing its process, such as, for example, a placement module, a replacement module, a pixel information extractor, a direction calculator, an identifier, a projector, a coordinate calculator, an image extractor, a pixel extractor and a texture extractor. Rendering pipeline 302 can access the database 304 directly. In an exemplary embodiment, the present invention can be integrated with existing rendering applications.

Figure 4:
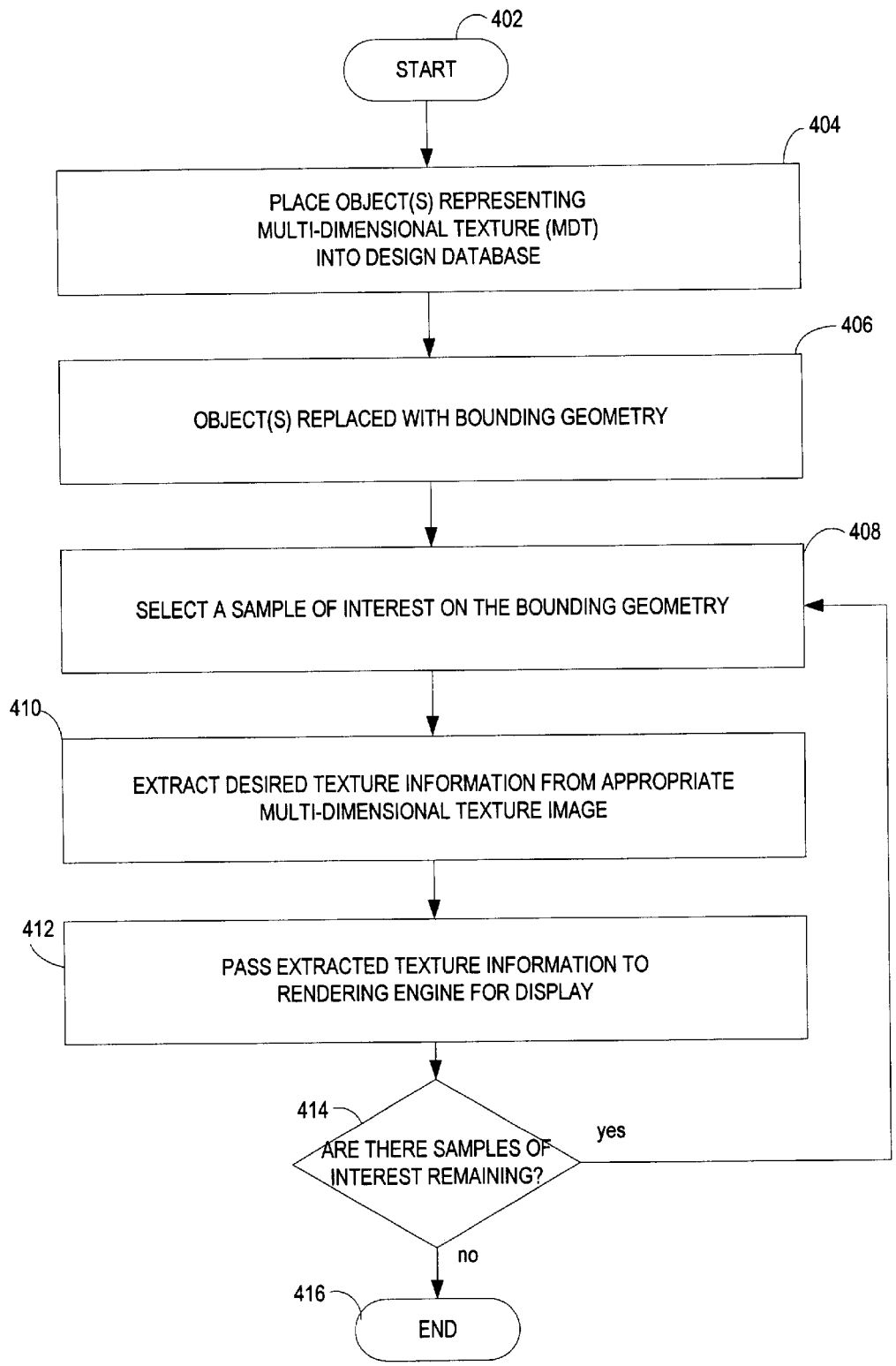
FIG. 4 is a flow chart representing the preferred order in which the invention is invoked.

FIG. 4 shows a flow chart 306 representing an overview of the steps with which the invention is invoked in the texture procedure. A user using a graphics editor that includes a rendering engine designs a scene. In step 404, the user places references to one or more MDT objects into the scene design database 304. In an exemplary embodiment, the user places the MDT objects in the database. The user then starts the software rendering process of the present invention.

In step 406, the present invention replaces the MDT object with a bounding geometry before the rendering engine begins its process. This replacement step is accomplished by obtaining the size of the object representation MDT and calculating the aspect ratio. The aspect ratio is the ratio between the width and height of the object. Then a volume, having the same aspect ratio, is created that bounds the MDT object. In an exemplary embodiment of the present invention, this bounding volume can be a cylinder topped with a hemisphere of diameter equal to the cylinder's diameter.

Once the bounding volume is in place, the rendering engine begins to render the object. When the rendering engine requires pixel information about the object, at step 408, a sample of interest on the bounding volume is selected by the rendering engine's sampler.

Using the sample of interest, the appropriate texture information is extracted from the corresponding MDT image in step 410. The details of step 410 are further explained below with regard to FIG. 5 and FIG. 6.

The extracted pixel information is passed back to the rendering engine in step 412. The rendering engine can then use the pixel information for displaying the rendered object. Alternatively, the pixel information can be stored for later use and display.

When the texture information for the bounding volume at all samples of interest has been extracted, determined at decision step 414, the rendering process ends at step 416.

Figure 5:
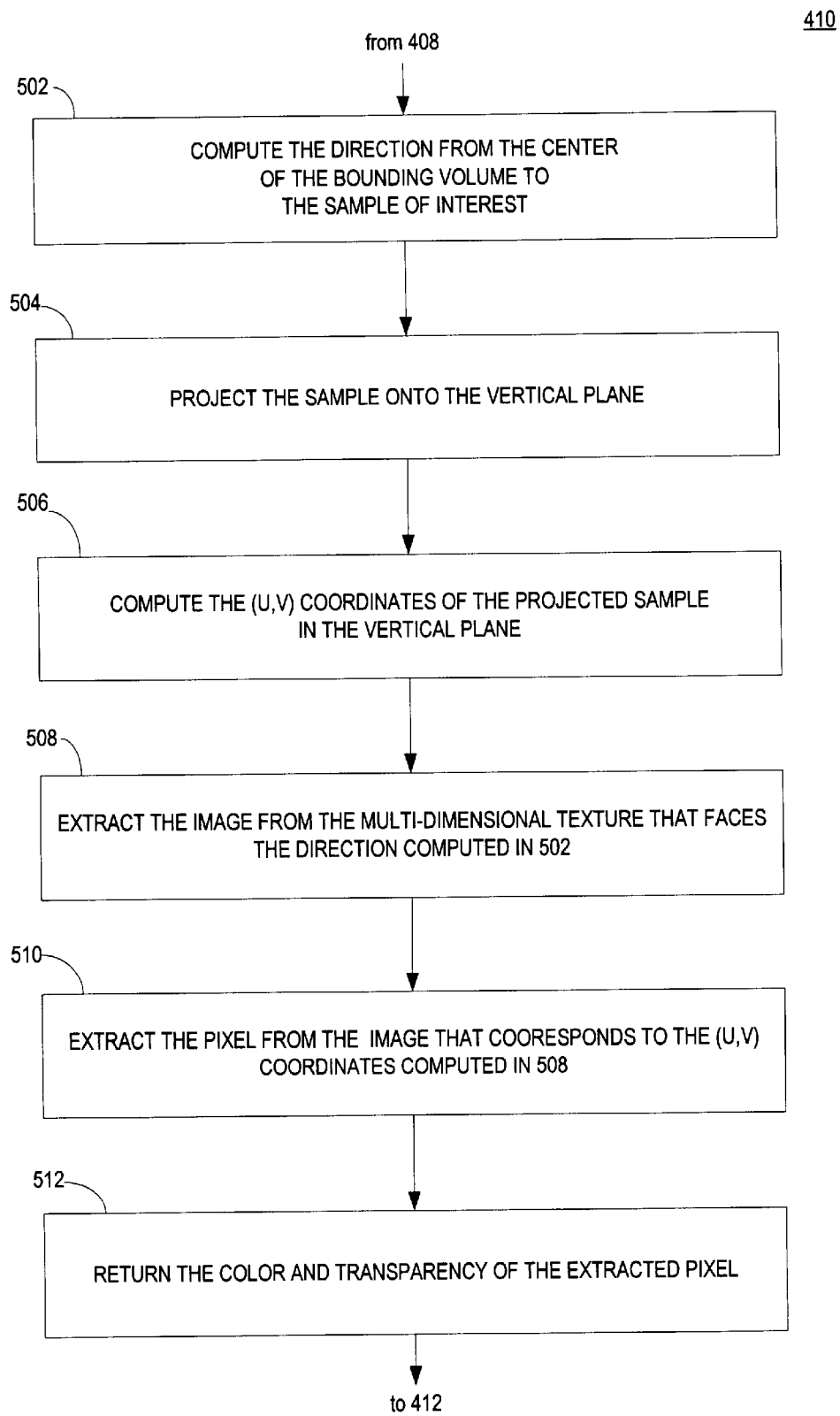
FIG. 5 is a flow chart demonstrating the method by which the pixel data to be displayed are generated.
Figure 6A:
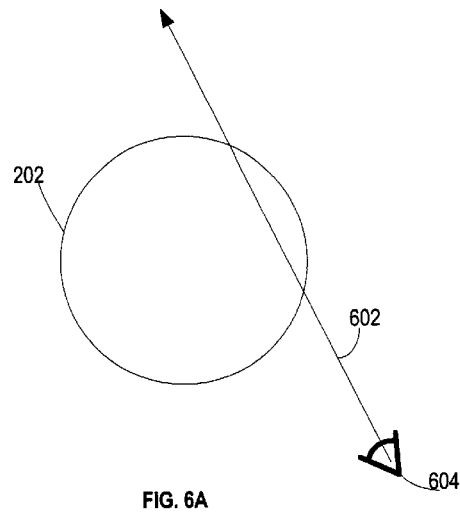
FIGS. 6A–6C depict the effects of the process of FIG. 5 from an overhead view of a bounding volume.
Figure 6B:
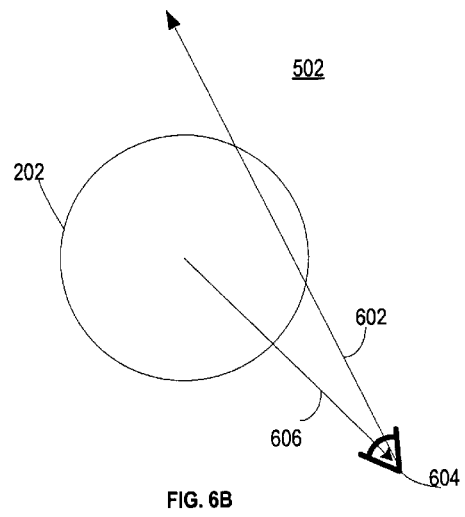
Figure 6C:
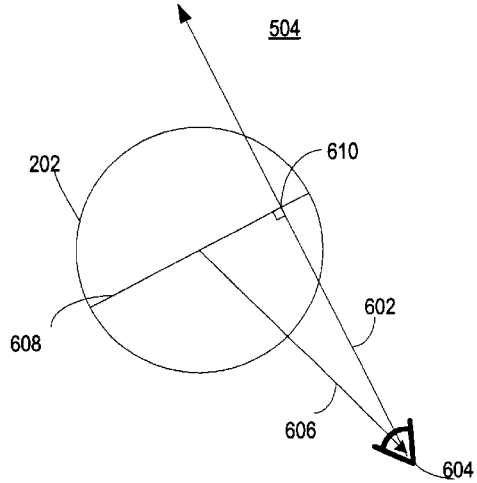

FIG. 5 depicts the details of step 410 in conjunction with FIGS. 6A–C. Each of FIGS. 6A–C is the same overhead view of a bounding volume in a scene. FIG. 6A illustrates a sample of interest 602. A sample of interest is a vector, having a magnitude and a direction. The origin 604 of the vector 602 is the location of the sample. A sample can be, for example, a camera, a light source, or a point on a mirror. The magnitude of the vector is from the origin 604 to the edge of the scene, and its direction is the same as the direction the sample faces.

With the sample of interest selected in step 408, the direction from the center of the bounding volume to the sample is calculated in step 502. FIG. 6B shows the directional line 606 from the center of bounding volume 202 to the origin 604 of the sample of interest.

Next, in step 504, the sample of interest is projected onto the vertical plane that intersects the center of the bounding volume and is perpendicular to the sample of interest vector. FIG. 6C shows the vertical plane 608 that contains the center point of bounding volume 202 and that is perpendicular to the sample of interest vector 602. The projection of the sample of interest 602 onto the vertical plane 608 is the point 610 at the intersection of the sample of interest and the vertical plane.

The UV coordinates of the projected sample are then computed in step 506. The coordinates are computed by setting the origin of the coordinate system at the lower left corner of the plane when viewed from the origin 604 of the sample of interest. The U coordinate of the projection point 610 is the horizontal distance from the plane origin to the point 610 and the V coordinate is the vertical distance to the point 610 from the plane origin.

The image that faces the direction computed in step 502 is next extracted from the MDT file in step 508. The extracted image is mapped onto the vertical plane 608. The origin of the selected image is located at the lower left corner of the vertical plane 608 when viewed from the origin of the sample of interest 604. The image is then scaled to fill the rectangle in the plane that is bounded by the bounding volume 202.

Then the pixel in the extracted image that corresponds to the UV coordinates from step 506 is extracted from the image in step 510. Finally, in step 512, texture information needed by the rendering engine is extracted from the pixel. In an exemplary embodiment, the extracted texture information can be any of: the color, transparency, z-depth or surface normals of a pixel. The Z-depth of a pixel is defined to be the pixel's position in the bounding volume in the Z direction, which is perpendicular to both the U and V directions. The surface normals of the pixel describe which direction the pixel on the object is facing, and can be used, for example, for more accurate shading of the object. The information about the extracted pixel is returned to the rendering engine. The process is repeated until all samples of interest have been examined.

The result is an accurately rendered image that can be viewed from multiple directions simultaneously, because more than one view source can be considered at any time. The ability to consider more than one view source simultaneously is provided by the use of the bounding geometry and the analysis of the view angle with respect to the bounding geometry.

Figure 7:
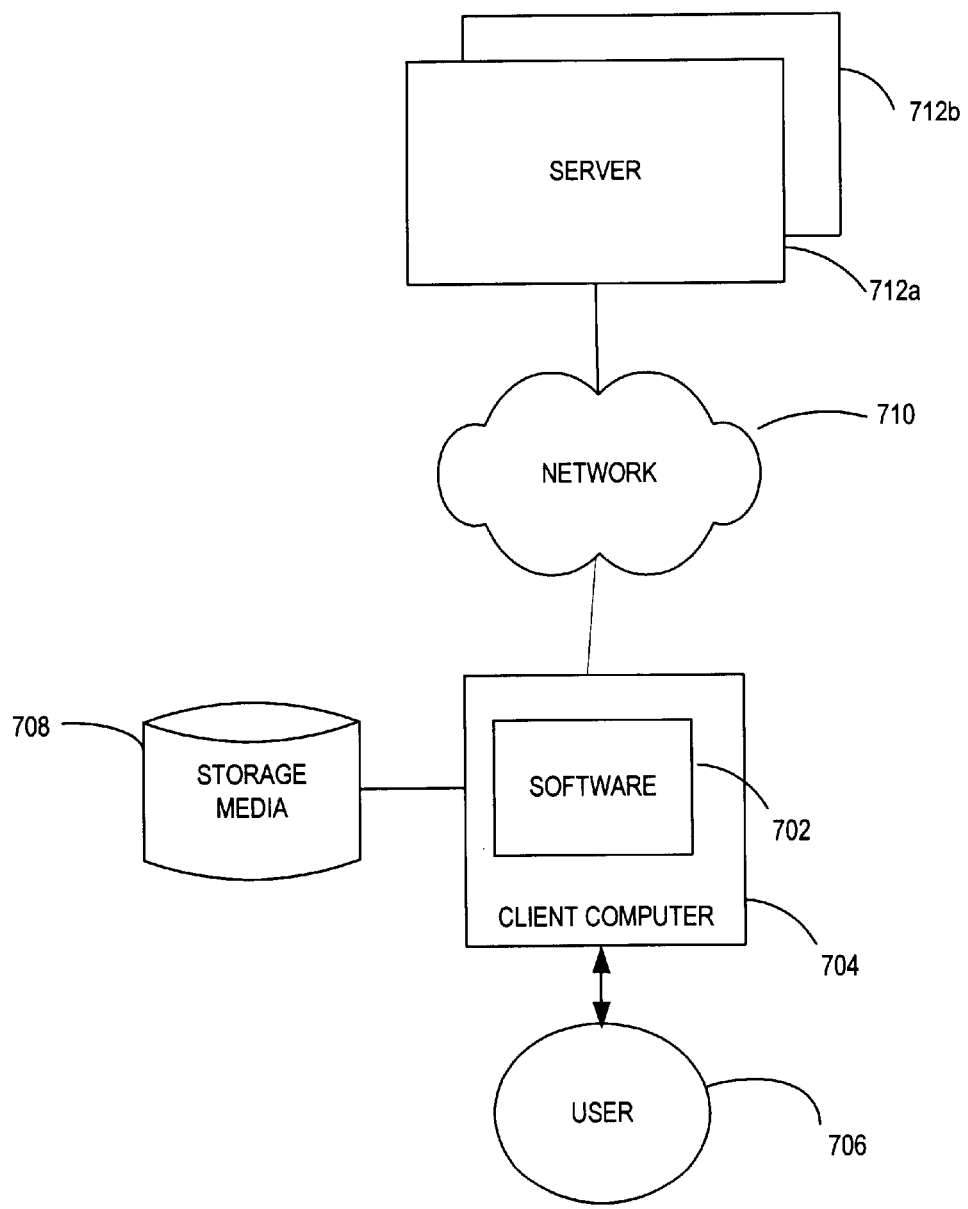
FIG. 7 depicts a block diagram of an exemplary system according to the present invention.

FIG. 7 depicts a block diagram 700 of an exemplary system according to the present invention. Block diagram 700 can include a user 706 interacting with a client computer 704 to access content on storage media 708 and servers 712a, 712b. Client computer 704 can include an operating system (not shown) and software application programs 702. Client computer 704 can be coupled in an exemplary embodiment to server 712a, 712b by network 710.

Figure 8:
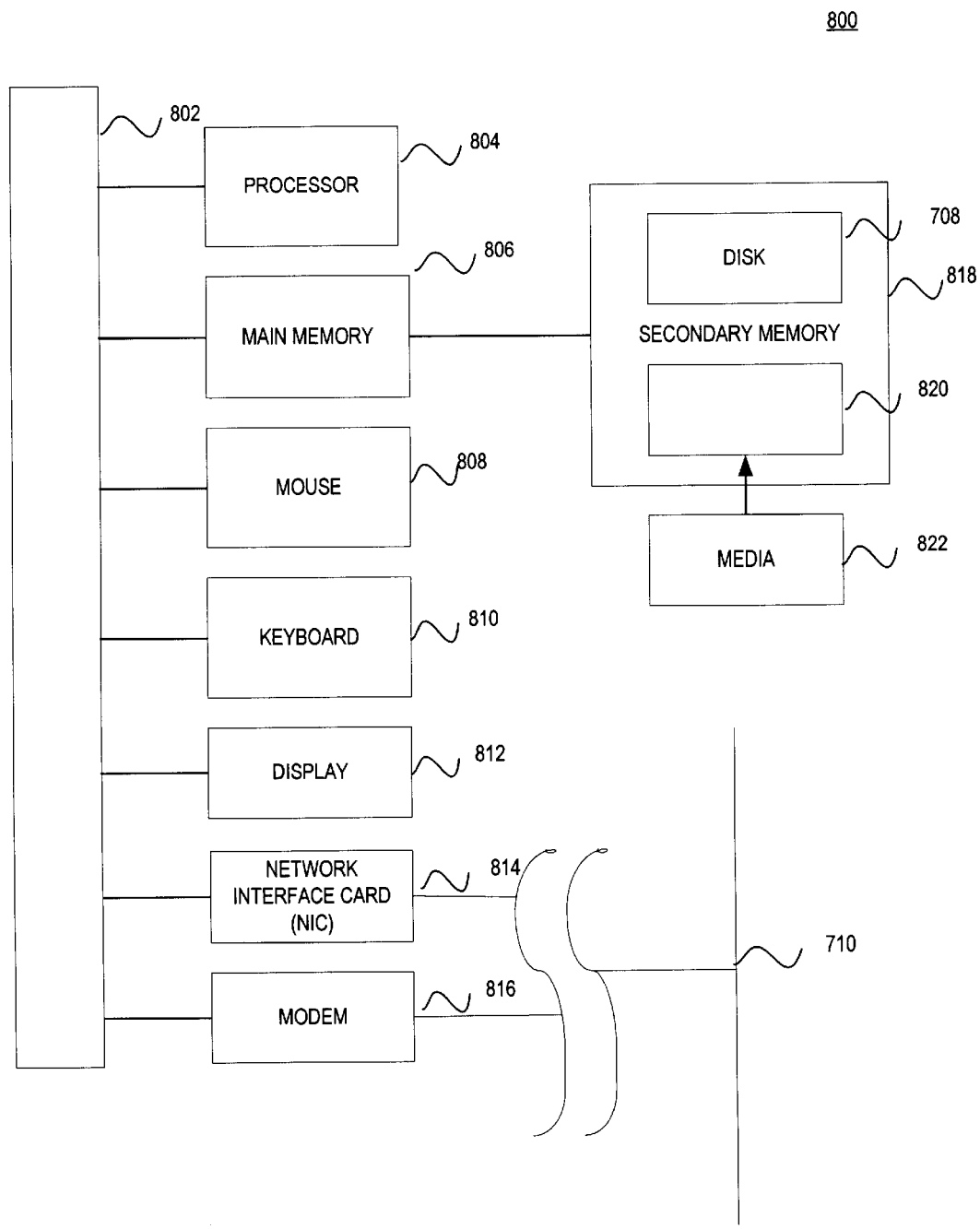
FIG. 8 depicts an exemplary embodiment of a computer system that could be used in the present invention.

FIG. 8 depicts an exemplary embodiment of a computer system 800 that could be used in the present invention. Specifically, FIG. 8 illustrates an exemplary embodiment of a computer 702, 712 which in a preferred embodiment is a computer that can include, e.g., a personal computer (PC) system running an operating system such as, e.g., Windows NT/98/2000/CE, OS/2, Mac/OS, LINUX, or other variants of the UNIX operating system. However, the invention is not limited to these platforms. Instead, the invention can be implemented on any appropriate computer system running any appropriate operating system, such as Solaris, Irix, Linux, HPUX, OSF, Windows 98, Windows NT, OS/2, Mac/OS, and any others, in addition to any electronic device capable of rendering images. In one embodiment, the present invention is implemented on a computer system operating as discussed herein.

The computer 702, 712 includes one or more processors, such as processor 804. The processor 804 is connected to a communication bus 802.

The computer 702, 712 can also include a main memory 806, preferably random access memory (RAM), and a secondary memory 818. The secondary memory 818 can include, e.g., a hard disk drive 708, or storage area network (SAN) and/or a removable storage drive 820, representing a floppy diskette drive, a magnetic tape drive, a compact disk drive, etc. The removable storage drive 820 reads from and/or writes to a removable storage unit 822 in a well known manner.

Removable storage unit 822, also called a program storage device or a computer program product, represents a floppy disk, magnetic tape, compact disk, etc. The removable storage unit 822 includes a computer usable storage medium having stored therein computer software and/or data, such as an object's methods and data.

The computer 702, 712 also includes an input device such as (but not limited to) a mouse 808 or other pointing device such as a digitizer, and a keyboard 810 or other data entry device.

The computer 702, 712 can also include output devices, such as, e.g., display 812. The computer 702, 712 can include input/output (I/O) devices such as, e.g., network interface cards 814 and modem 816.

Computer programs (also called computer control logic), including object oriented computer programs, are stored in main memory 806 and/or the secondary memory 818 and/or removable storage units 822, also called computer program products. Such computer programs, when executed, enable computer 702, 712 to perform the features of the present invention as discussed herein. In particular, the computer programs, when executed, enable the processor 804 to perform the features of the present invention. Accordingly, such computer programs represent controllers of the computer system 804, 702, 712.

In another embodiment, the invention is directed to a computer program product comprising a computer readable medium having control logic (computer software) stored therein. The control logic, when executed by the processor 804, causes the processor 804 to perform the functions of the invention as described herein.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method in a computer system for global rendering of a multidimensional texture map comprising:
   placing a representation for a multidimensional texture map of an object into a database;
   replacing said representation with a bounding geometry;
   sampling said bounding geometry with a sample of interest comprising an origin and a direction,
   computing a direction from the center of said bounding geometry to the origin of said sample of interest;
   identifying a vertical plane that contains the center point of said bounding geometry and that is perpendicular to said sample of interest;
   projecting said sample onto said vertical plane,
   computing a coordinate of said projected sample in said vertical plane,
   extracting an image from a multi-dimensional texture wherein said image faces said computed direction,
   extracting a pixel from said image that corresponds to said coordinate;
   extracting as pixel information at least one of a color, a transparency, a Z-depth and a surface normal of said extracted pixel; and
   displaying said object using said extracted pixel information.

2. The method of claim 1, wherein said bounding geometry is a volume that completely encloses said object.

3. The method of claim 2, wherein said volume is a cylinder with a height equal to said object, and a diameter equal to the width of said object; and wherein said cylinder is capped by a hemisphere of said diameter.

4. The method of claim 1, wherein said sample of interest is determined by an external rendering engine.

5. The method of claim 4, wherein said origin of said sample of interest is at least one of a camera, a light source and a point on a reflecting surface.

6. The method of claim 1, wherein said origin of said sample of interest is at least one of a camera, a light source and a point on a reflecting surface.

7. The method of claim 1, wherein said bounding geometry is a volume that completely encloses said object.

8. The method of claim 7, wherein said volume is a cylinder with a height equal to said object, and a diameter equal to the width of said object; and wherein said cylinder is capped by a hemisphere of said diameter.

9. The method of claim 1, wherein said sample of interest is determined by an external rendering engine.

10. The method of claim 1, wherein said origin of said sample of interest is at least one of a camera, a light source and a point on a reflecting surface.

11. The method of claim 1, wherein computing a coordinate of said projected sample in said vertical plane comprises:
    setting a coordinate origin at the lower left corner of said vertical plane as viewed from said origin of said sample of interest;
    computing a U coordinate of said projected sample as the horizontal distance from said coordinate origin to said projected sample; and
    computing a V coordinate of said projected sample as the vertical said coordinate origin to said projected sample.

12. A system that performs global rendering of a multi-dimensional texture map comprising:
    a processor;
    a memory coupled to said processor;
    a rendering engine executable by said processor;
    a multidimensional texture (MDT) map global rendering module executable by said processor operative to render MDT's globally, wherein MDT map global rendering module comprises:
       a placement module operative to place a representation for a MDT map of an object into a database;
       a replacement module that replaces said representation with a bounding geometry;
       a sampler that samples said bounding geometry with a sample of interest comprising an origin and a direction; and
    an pixel information extractor, comprising:
       a direction calculator that computes a direction from the center of said bounding geometry to the origin of said sample of interest;
       an identifier that identifies a vertical plane that contains the center point of said bounding geometry and that is perpendicular to said sample of interest;
       a projector that projects said sample onto said vertical plane;
       a coordinate calculator that computes a coordinate of said projected sample in said vertical plane;
       an image extractor that extracts an image from a multi-dimensional texture wherein said image faces said computed direction;
       a pixel extractor that extracts a pixel from said image that corresponds to said coordinate; and
       a texture extractor that extracts at least one of a color, a transparency, a z-depth, and a surface normal of said extracted pixel.

13. The system of claim 12, further comprising a display.

14. The system of claim 12, wherein said bounding geometry is a volume that completely encloses said object.

15. The system of claim 14, wherein said volume is a cylinder with a height equal to said object, and a diameter equal to the width of said object; and wherein said cylinder is capped by a hemisphere of said diameter.

16. The system of claim 12, wherein said sample of interest is determined by an external rendering engine.

17. The system of claim 12, wherein said origin of said sample of interest is at least one of a camera, a light source and a point on a reflecting surface.

18. A method for rendering objects:
    identifying a representation in a scene for a multidimensional texture map for an object;
    dynamically replacing the representation with a three-dimensional volume;
    determining points of view of the volume in the scene;
    determining an origin and a direction for the point of view;
    computing a direction from a center of the volume to the origin of the point of view;
    identifying a vertical plane that contains the center point of the volume and that is perpendicular to the point of view;
    projecting the point of view onto the vertical plane;
    computing a coordinate of the projected point of view in the vertical plane;

extracting an image from a multi-dimensional texture wherein the image faces the computed direction;

extracting a pixel from the image that corresponds to the coordinate;

extracting as pixel information at least one of a color, a transparency, a Z-depth and a surface normal of the extracted pixel; and displaying the object using the pixel information.

19. The method of claim 18, wherein the place-holder includes information regarding the multidimensional texture map.

20. The method of claim 18, wherein the information includes at least one of a location, orientation, scale, and name for multidimensional texture map.

21. The method of claim 18, further comprising calculating a color and transparency for the pixel information.

22. The method of claim 18, wherein the volume completely encloses the object.

23. The method of claim 18, wherein computing a coordinate of the projected point of view in the vertical plane comprises:

setting a coordinate origin at the lower left corner of the vertical plane as viewed from the origin of the point of view;

computing a U coordinate of the projected point of view as the horizontal distance from the coordinate origin to the projected point of view; and computing a V coordinate of the projected point of view as the vertical the coordinate origin to the projected sample.

* * * * *